United States Patent

[11] 3,629,684

[72] Inventors Roland W. Christen
Garfield Heights;
John C. Guyeska, Novelty; Gerald H. Horstman, Bedford, all of Ohio
[21] Appl. No. 83,285
[22] Filed Oct. 23, 1970
[45] Patented Dec. 21, 1971
[73] Assignee Lear Siegler, Inc.
Santa Monica, Calif.

[54] POWER SUPPLY WHEREIN STAR-CONNECTED WINDINGS ARE ARRANGED TO PRODUCE FIELDS MECHANICALLY COINCIDENT AND ELECTRICALLY OUT OF PHASE
7 Claims, 9 Drawing Figs.

[52] U.S. Cl. .................................................. 321/7,
310/184, 321/26, 321/68
[51] Int. Cl. ........................................................ H02m 5/14,
H02m 5/16, H02m 5/20

[50] Field of Search ........................................... 321/7, 26,
57, 68; 310/179, 184, 198

[56] References Cited
UNITED STATES PATENTS
2,892,142 6/1959 Genuit ........................... 321/7
3,431,483 3/1969 Lafuze ........................... 321/7
3,549,919 12/1970 Spisak et al. .................. 310/184 X

*Primary Examiner*—Gerald Goldberg
*Attorney*—Bosworth, Sessions, Herrstrom & Cain ABSTRACT: A power supply comprising a polyphase source of higher frequency alternating current and a rectifying system connected to it for providing a single-phase output of a lower frequency alternating current and/or unidirectional current of one or both polarities. The polyphase source has output windings arranged in a manner to increase the degree of utilization of the core by minimizing the net magnetomotive forces produced by large unidirectional current components present in the windings and tending to saturate the core.

PATENTED DEC 21 1971

INVENTORS
ROLAND W. CHRISTEN,
JOHN C. GUYESKA,
& GERALD H. HORSTMAN
BY Bosworth, Sessions,
Herstman & Cain
ATTORNEYS

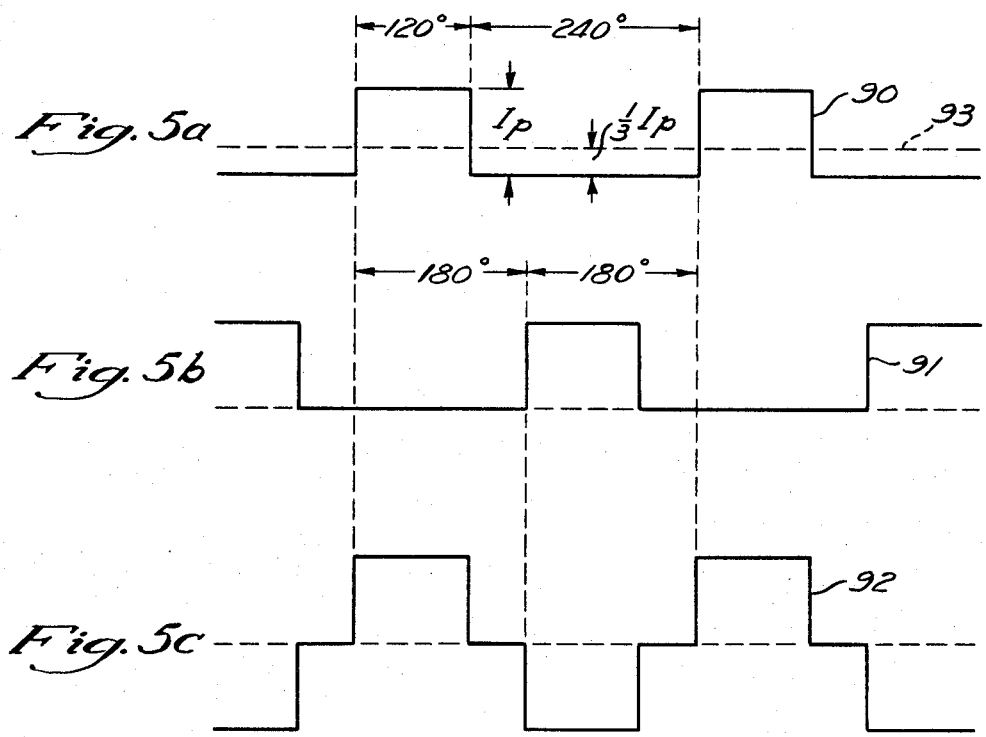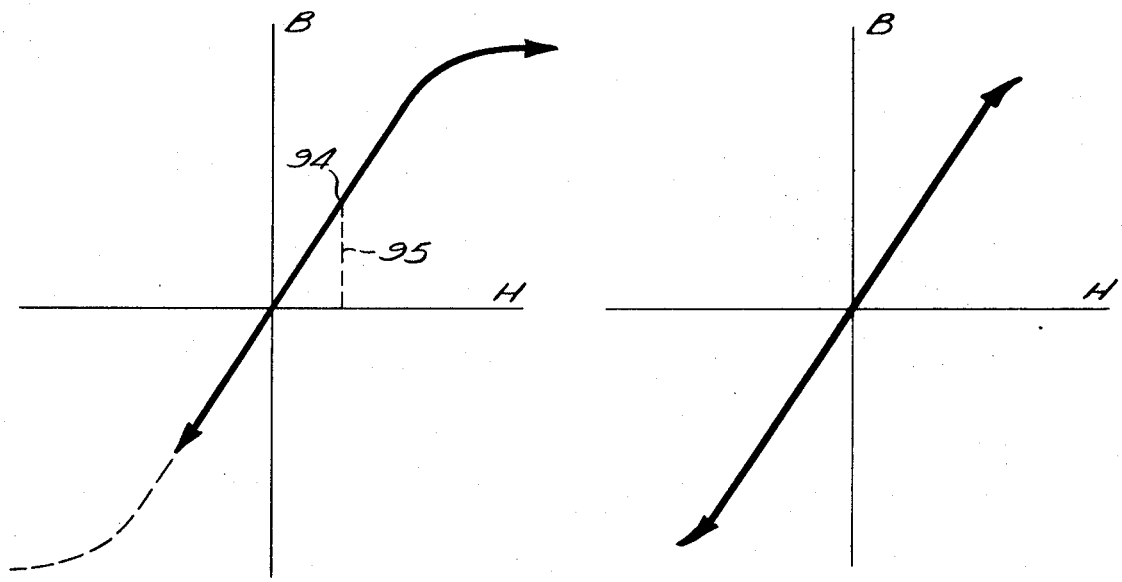

3,629,684

POWER SUPPLY WHEREIN STAR-CONNECTED WINDINGS ARE ARRANGED TO PRODUCE FIELDS MECHANICALLY COINCIDENT AND ELECTRICALLY OUT OF PHASE

BACKGROUND OF THE INVENTION

This invention relates to power supply systems which provide a single-phase output of a low-frequency alternating current or a unidirectional current of one or both polarities from a polyphase source of high-frequency alternating current. Such systems comprise a polyphase alternating current source having a plurality of conventional output windings on a stator core of magnetic material, as, for example, an alternator. The polyphase source is connected to a system of rectifiers, diodes, or controlled rectifiers, arranged to provide the desired output.

An example of a known system of this general type is shown in FIG. 1 of the drawings. The alternating-current source comprises a six-phase alternator having six, star-connected, output windings 11–16. Diodes 21–26 are connected to the output windings as shown to permit current flow through all the windings in only one and in the same direction with respect to their common connection 17. Diodes 21–26 are all connected to output terminal 27 on one side of the load and the common connection 17 to output terminal 28 on the other side. The system provides a single-phase unidirectional current output from a polyphase alternating-current source.

In the system of FIG. 1, output windings 11–16 are circumferentially disposed around the magnetic core of the stator. Each winding occupies one-sixth of the stator slots. Diodes 21–26 permit only a net unidirectional current to flow in each winding 11–16 resulting in a static magnetomotive force. Since it is inefficient and otherwise undesirable to operate the alternator and its magnetic core at or near saturation, a core large enough to support the net unidirectional current and resulting static magnetomotive force without saturation must be provided. It will be apparent that an unbalanced magnetomotive force acting to drive the core toward saturation in only one direction makes poor and inefficient use of the magnetic core.

Poor utilization of the core "iron" can also be found in power systems of the general type under consideration here, even when the output is sinusoidally varying unidirectional current. The system shown in FIG. 2, for example, comprising a six-phase star-connected alternator having output windings 31–36 connected to a duplex, six-phase cycloconverter having four, three-phase, half-wave rectifier systems indicated generally at 38–41 provides a single-phase, alternating-current output. One half wave of lower frequency output current is synthesized from the higher frequency polyphase alternator output by rectifier systems 38 and 39 comprising a positive group, and the other half wave by rectifier systems 40 and 41 comprising a negative group. As shown, each group consists of six controlled rectifiers, one connected to each of the six alternator output windings 31–36. All the controlled rectifiers of one group have their anodes connected to the output windings and all those of the other group, their cathodes. The two groups are interconnected through interphase transformers 42 and 43 to provide one terminal 45 of a single-phase output. The other output terminal 46 is connected to the common connection 37 of the alternator output windings.

In operation of the system shown in FIG. 2, for example, the alternator frequency might be 1,600 Hz. and the output, a frequency from steady unidirectional to 400 Hz., depending upon the firing scheme applied to the controlled rectifiers. Bearing in mind that, at any one time, only one group of controlled rectifiers is on and that system output frequency is, at most, a fraction of that of the alternator, it will be apparent that each controlled rectifier group draws current in the same direction from the alternator output windings for many cycles of alternator frequency. Thus, each winding carries a current having a substantial direct current component and produces a magnetomotive force tending to saturate the stator core. Therefore, to the extent required by the direct current component, the stator core must be larger and heavier and less efficient than would otherwise be necessary.

In many applications and especially in aircraft, efficiency of performance of power supply systems of the general type described above as reflected in weight and size of equipment is a primary consideration. Therefore, it is a primary object of this invention to provide such a power supply system having a substantially greater efficiency in terms of machine utilization than known examples thereof and thereby to provide a smaller, lighter stator core for the alternator element of the system. A further object is to improve the machine utilization of an alternator-rectifier system power supply by reducing the net direct current component of the current in the alternator output windings and, thus, the static magnetomotive force tending to saturate the stator core.

BRIEF SUMMARY OF THE INVENTION

Briefly, this invention comprises an alternator in an alternator-rectifier system power supply having polyphase star-connected output or phase windings, of which one-half are circumferentially spaced about the core to provide a first set of fields displaced both mechanically and in electrical phase relationship, and the other half are also circumferentially spaced about the stator to provide a second set of fields comprising a field mechanically coincident and electrically out of phase with each field of the first set. To an extent dependent upon their out-of-phase relationship, the currents in the mechanically coincident phase windings tend to reduce any net direct current component acting to saturate the stator core. Power supply systems embodying this invention thereby require a stator of less weight and smaller size than would be required for a system of comparable power rating and having conventionally wound stator windings.

BRIEF DESCRIPTION OF THE DRAWINGS

FIGS. 5a, 5b, 5c, 6a, and 6b are plots of operating parameters of circuits shown in FIGS. 1 through 4.

DETAILED DESCRIPTION OF A PREFERRED EMBODIMENT

Figure 3:
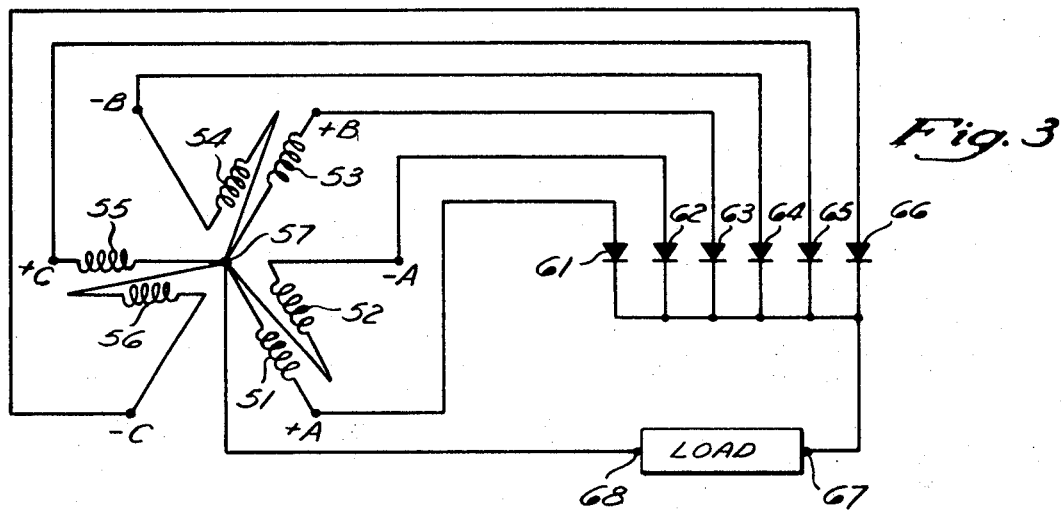
FIGS. 3 and 4 are schematic circuit diagrams of two embodiments of this invention.

In FIG. 3 is shown a power supply embodying this invention and made up of a six-phase alternating-current source having output windings 51–56 and a rectifier system having six rectifying devices or diodes 61–66. The anodes of diodes 61–66 are connected to the free ends of output windings 51–56, respectively. The rectifier system provides a single-phase output between output terminal 67, the common cathode connection of diodes 61–66, and output terminal 68, the common connection 57 of output windings 51–56. In FIG. 3, a load is shown connected across the output terminals.

Figure 1:
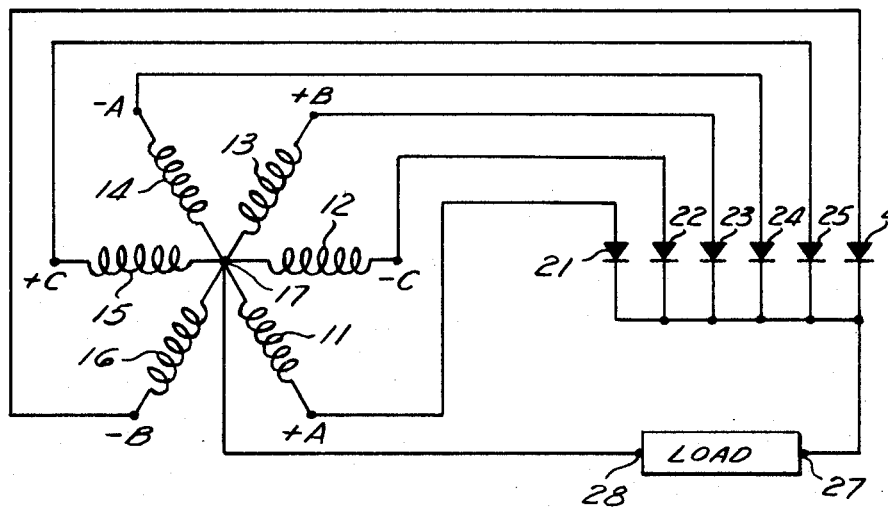
FIGS. 1 and 2 are schematic circuit diagrams of conventional power supply systems that are exemplary of the problem solved by this invention.

The power supply of FIG. 3 corresponds generally to the conventional supply shown in FIG. 1. In the FIG. 1 system, output windings 11–16 are circumferentially spaced about the stator to provide six mechanically and electrically displaced fields with each winding occupying one-sixth of the stator slots. The electrical displacement is conventionally described as comprising three phases +A, +B, and +C (windings 11, 13, and 15, respectively) electrically displaced by intervals of 120° and each having an associated phase −A, −B, and −C, (windings 14, 16, and 12, respectively) electrically displaced 180° from it.

In the system embodying this invention shown in FIG. 3, output windings 51–56 are also electrically displaced or out of phase and may be described in terms of phases +A, +B, +C, −A, −B, and −C corresponding to the similarly identified phases in the FIG. 1 system. Output windings 51–56 of the FIG. 3 system, however, are arranged differently in the stator. Each occupies one-third of the stator slots. For example, output windings 51 and 52 of phases +A and −A share the same slots, and so on, and the fields produced by the windings thus associated are generally mechanically coincident.

Although current flow through the output windings in the systems of both FIGS. 1 and 3 is permitted in only one and the same direction with respect to the common connections 17 and 57, the positive and negative phase-associated windings of the embodiment of this invention (FIG. 3) provide fields of opposite polarity; i.e., each field of a pair tends to drive the stator core toward opposite states of saturation. In the conventional system of FIG. 1, of course, the direct currents in the output windings all provide fields tending to drive the stator core toward the same state of saturation. Not having to support a single-polarity magnetizing current as does the stator core in a conventional system (FIG. 1), the stator core of the alternating-current source in the system embodying this invention (FIG. 3) can be smaller and lighter for a given power rating; i.e., the generator utilization is higher.

Figure 2:
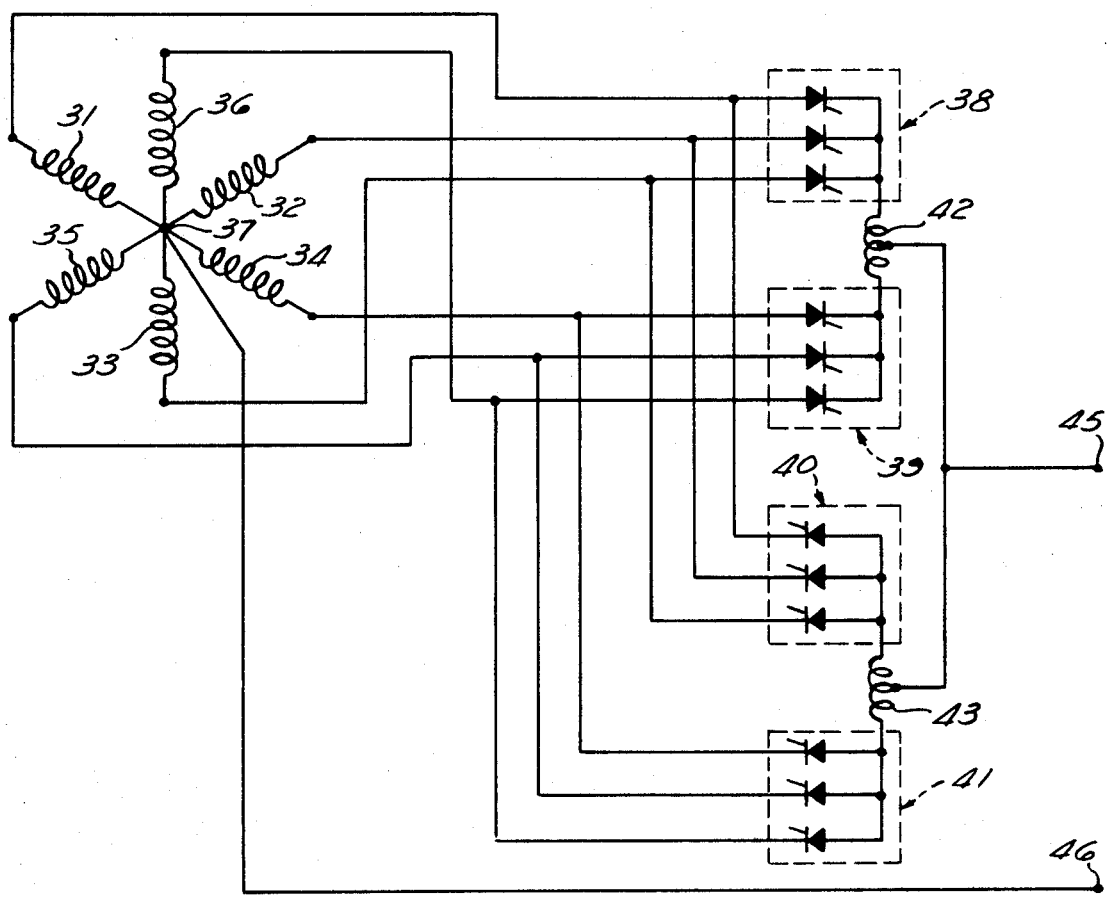
Figure 4:
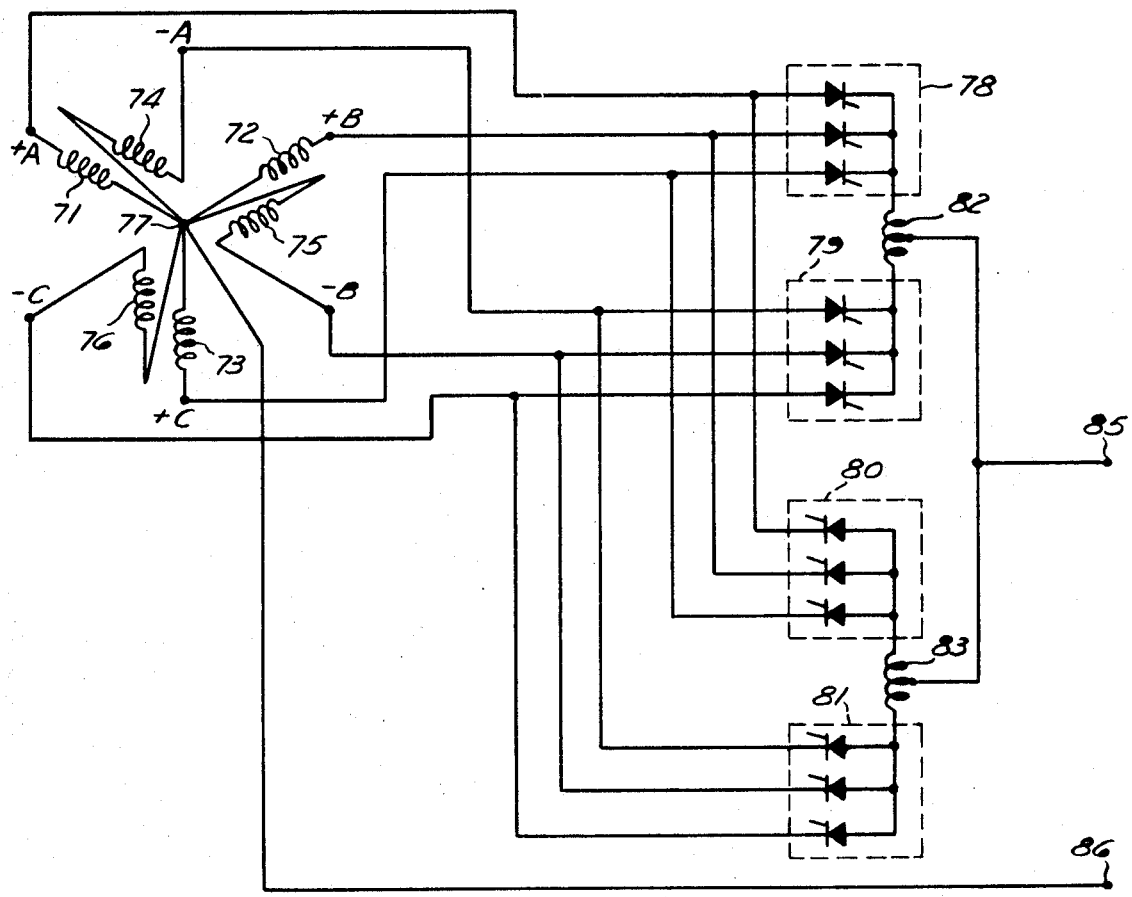

FIG. 4 shows a power supply system for providing a single-phase direct current or varying direct current output from a polyphase alternating-current source, and a system which corresponds to that shown FIG. 2. Both systems comprises a polyphase alternating-current source such as a six-phase, star-connected alternator in combination with a duplex six-phase cycloconverter. The alternator has output windings 71–76 comprising electrical phases +A, +B, +C, −A, −B, and −C, respectively. The cycloconverter has four three-phase half-wave rectifier systems 78–81, divided into a positive group (78 and 79) and a negative group (80 and 81) in a manner known in cycloconverter power circuits. Each group consists of six controlled rectifiers, one connected to each of the six alternator output windings 71–76. All the controlled rectifiers of one group have their anodes connected to their associated output windings and all those of the other group, their cathodes. The positive and negative groups are interconnected through interphase transformers 82 and 83 to provide terminal 85 of a single-phase output. The other output terminal 86 is connected to the common connection 77 of the alternator output windings.

The embodiment of this invention shown in FIG. 4, like that of FIG. 3, includes alternator output windings that are electrically out of phase and mechanically coincident. The phases +A, +B, and +C have 120° mechanical and electrical intervals between them; and the phases −A, −B, and −C are each mechanically coincident with and electrically displaced 180° from the positive phase of the same letter name. Output windings 71–76 each occupies one-third of the stator slots with windings 71 and 74 of phases +A and −A sharing one set; 72 and 75 of phases +B and −B, another; and, 73 and 76 of phases +C and −C, the set comprising the remaining third of the stator slots.

Also, as in the alternator windings in the circuit of FIG. 3, although current in the output windings of the FIG. 4 alternator is permitted to flow in only one and the same direction with respect to the common connection 77, the windings of each positive and negative associated pair of phases provide fields of opposite polarity; i.e., fields tending to drive the stator core toward opposite states of saturation. As explained in connection with the FIG. 3 circuit, such an arrangement of the alternator output windings minimizes, if not eliminates, a net magnetizing current, permitting greater utilization of the stator "iron" and/or a smaller and lighter core for a given power rating. This is true even though the single-phase output may be alternating or sinusoidally varying direct current produced by alternating periods of conduction at output frequency of the positive and negative rectifier groups, for, during each half wave of output, current flow is always in the same direction with respect to their common connection through all the windings. Thus, by mechanical arrangement, associated pairs of output windings produce magnetizing fields which tend to cancel each other and do not drive the core only to one or the other state of saturation.

This invention is particularly advantageous in systems having six-phase alternators. This can be demonstrated graphically. In FIGS. 5a and 5b are shown the line current wave shapes 90 and 91 of phases +A and −A, respectively. Wave 92 of FIG. 5c is a graphic representation of the slot magnetomotive force produced by the combination of the line currents of phases +A and −A when combined and mechanically and electrically related as taught by this invention. It will be seen there is no net direct current as produced by the output winding of phase +A in the alternators of FIGS. 1 and 2. In FIG. 5a, this net direct current is represented by the broken straight line 93 superimposed on line current wave shape 90 of phase +A.

The consequence of the presence and lack of a net direct magnetizing current is shown in FIGS. 6a and 6b. FIG. 6a shows the B–H curve of a stator core magnetized by current windings arranged in a conventional manner as shown and described in connection with the circuits of FIGS. 1 and 2 and with line current waves as illustrated in FIG. 5a. The net direct current described above displaces the operating midpoint from the origin of the plot to a point on magnetization curve 94 having an H coordinate at, for example, the value indicated by broken line 95.

In FIG. 6b, the magnetization curve is symmetrical about the origin of the B and H axes and offers maximum magnetization in both directions before a given state of saturation is achieved.

Finally, the advantages of this invention are significantly independent of output frequency so long as it is at most about one-third alternator frequency. The invention, when practiced as shown in FIG. 4 to provide a single-phase, two-wire output, results in about a 50 percent increase in alternator utilization over that achieved by the FIG. 2 circuit.

Those skilled in the art will appreciate that various other changes and modifications can be made in the preferred form of apparatus described herein without departing from the spirit and scope of the invention.

We claim:

1. A power supply system comprising
a polyphase source of alternating current of higher frequency having star-connected output windings on a stator core of magnetic material,
a plurality of rectifying devices connected to the output windings of said alternator to provide a single-phase system output of lower frequency, and including a group of rectifying devices connected to permit current flow in the same direction from all of said output windings with respect to their common connection,
one-half of said phase windings being circumferentially spaced about said stator core to provide a first set of fields displaced both mechanically and in electrical phase relationship, and the other half of said phase windings being circumferentially spaced about said stator core to provide a second set of fields comprising a field mechanically coincident and electrically out of phase with each field of said first set.

2. The system according to claim 1 in which the higher frequency of said alternating-current source is no less than about three times the lower frequency of said system output.

3. The system according to claim 1 in which mechanically coincident fields of said first and second sets are electrically out of phase by 180°.

4. The system according to claim 3 in which said polyphase output windings are disposed in circumferentially spaced stator slots in the stator core, each phase winding occupying $2/n$ of the total stator slots, where "$n$" is the number of output phase windings, the pairs of windings providing said mechanically coincident fields occupying the same slots.

5. The system according to claim 1 in which said plurality of rectifying devices comprises a first and a second group connected to permit current flow in one direction and in the other direction, respectively, from all of said output windings with respect to their common connection.

6. The system according to claim 5 in which said source of alternating current comprises an alternator having six-phase output windings and said plurality of rectifying devices are controlled rectifiers arranged as a duplex six-phase cycloconverter.

7. The system according to claim 6 in which said output windings are disposed in circumferentially spaced stator slots in the stator core, each of said windings occupying one-third of said slots, the pairs of windings providing said mechanically coincident fields occupying the same slots and being electrically out of phase by 180°.

* * * * *